(12) United States Patent
Park et al.

(10) Patent No.: US 8,046,666 B2
(45) Date of Patent: Oct. 25, 2011

(54) COMBINED DC RESTORATION DOUBLE DETECTION AND LOOPS

(75) Inventors: Jongseung Park, Allentown, PA (US); Andrei E. Vityaev, San Jose, CA (US); Li Du, Broomfield, CO (US)

(73) Assignee: LSI Corporation, Milpitas, CA (US)

( * ) Notice: Subject to any disclaimer, the term of this patent is extended or adjusted under 35 U.S.C. 154(b) by 1029 days.

(21) Appl. No.: 11/835,706

(22) Filed: Aug. 8, 2007

(65) Prior Publication Data

US 2009/0044084 A1 Feb. 12, 2009

(51) Int. Cl.
*H03M 13/00* (2006.01)
(52) U.S. Cl. ........................... 714/774; 714/795
(58) Field of Classification Search ................. 714/774, 714/795
See application file for complete search history.

(56) References Cited

U.S. PATENT DOCUMENTS

| | | | |
|---|---|---|---|
| 5,815,507 A * | 9/1998 | Vinggaard et al. | 714/704 |
| 6,201,839 B1 * | 3/2001 | Kavcic et al. | 375/341 |
| 7,738,202 B1 * | 6/2010 | Zheng et al. | 360/46 |
| 7,743,314 B2 * | 6/2010 | Stockmanns et al. | 714/796 |
| 2002/0196747 A1 * | 12/2002 | Agazzi | 370/286 |
| 2004/0037373 A1 * | 2/2004 | Ashley et al. | 375/341 |
| 2005/0044474 A1 | 2/2005 | Zaboronski et al. | 714/794 |

* cited by examiner

*Primary Examiner* — M. Mujtaba Chaudry
(74) *Attorney, Agent, or Firm* — Christopher P. Maiorana, PC

(57) ABSTRACT

A method of double detection in a perpendicular magnetic read channel is disclosed. The method generally includes the steps of (A) generating an intermediate signal by performing a first detection on an input signal of the perpendicular read channel, the first detection having a first error rate, (B) generating a statistics signal based on the intermediate signal, the statistics signal conveying noise statistics that depend on data in the input signal and (C) generating an output signal by performing a second detection on the input signal using the noise statistics to reduce a second error rate of the second detection compared with the first error rate, wherein the first detection is independent of the second detection.

20 Claims, 3 Drawing Sheets

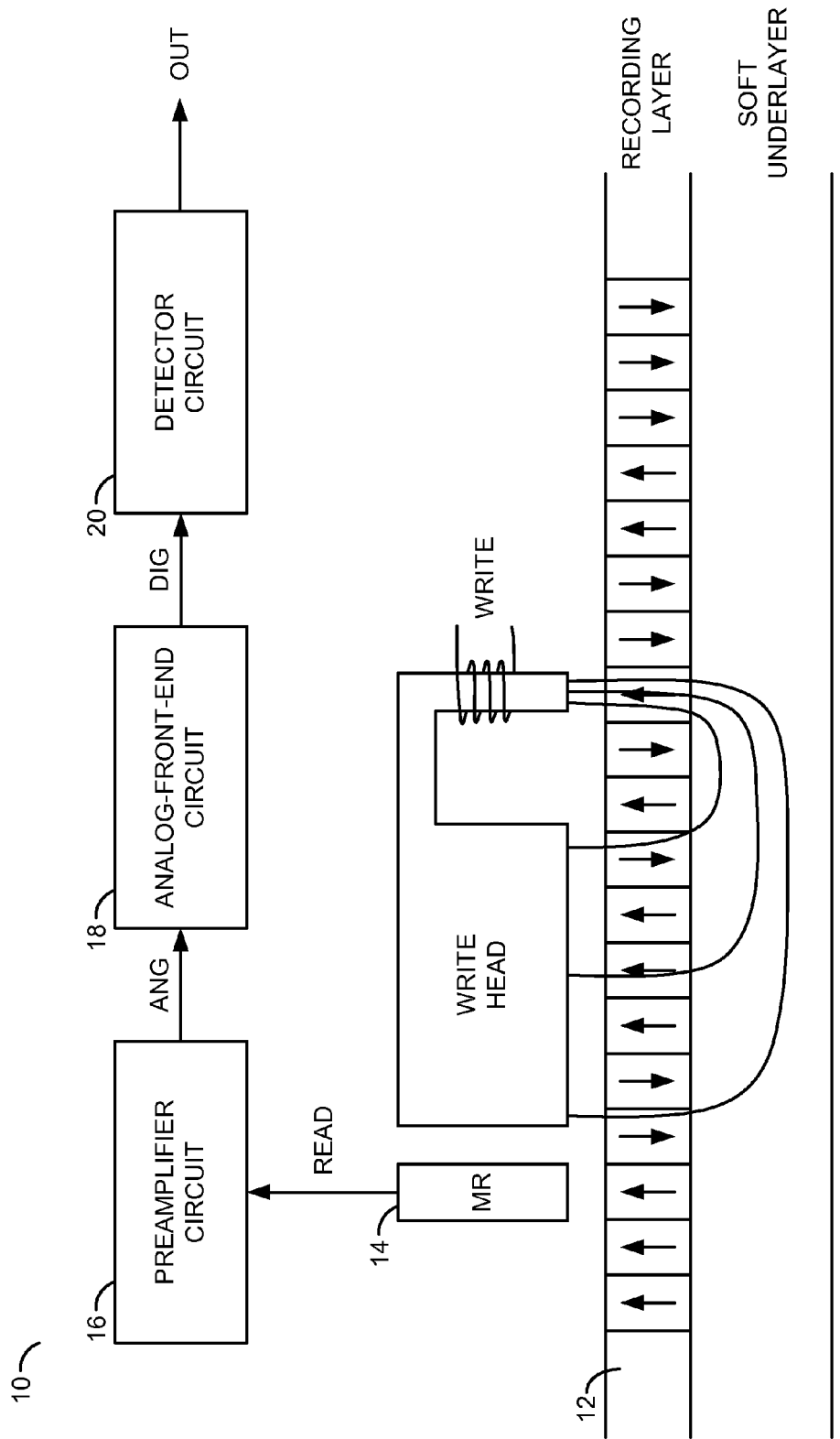
FIG. 1
(CONVENTIONAL)

US 8,046,666 B2

COMBINED DC RESTORATION DOUBLE DETECTION AND LOOPS

CROSS REFERENCE TO RELATED APPLICATIONS

The present application is related to application Ser. No. 11/770,243 filed Jun. 28, 2007, now U.S. Pat. No. 7,602,567, which is hereby incorporated by reference in its entirety.

FIELD OF THE INVENTION

The present invention relates to magnetic medium read channels generally and, more particularly, to a combined DC restoration double detection and loops.

BACKGROUND OF THE INVENTION

Referring to FIG. 1, a diagram of a front end in a conventional system 10 having a perpendicular magnetic medium 12 is shown. A read signal sensed from the perpendicular magnetic medium 12 has a large amount of power around a DC component. In a conventional read channel, a preamplifier circuit 16 in a magneto-resistive (MR) read head 14 and AC coupling in an analog-front-end circuit 18 block transmission of the DC components of the data read from the medium 12. The preamplifier 16 and the analog-front-end circuit 18 remove only a very narrow frequency band around DC of the transmitted signal to avoid a large signal-to-noise ratio (SNR) loss. The resulting DC-free signal shows a sharp frequency response change around DC and is difficult to equalize to a predefined partial response target. To equalize the DC-free signal properly without incurring a significant SNR loss, both a long equalizer target and a long equalizer are commonly implemented. However, the common implementations result in complex and power hungry systems. Alternatively, refilling the lost DC signal (i.e., DC restoration) by feeding back hard decisions from a detector 20 can achieve a similar SNR gain.

Existing solutions to handle the DC restoration problem have a feedback loop that starts from the detector 20 and ends around an analog-to-digital converter (ADC) in the analog-front-end circuit 18. The feedback loop computes and restores the missing DC components before the detector 20.

The existing solutions have an intrinsic problem of having a long delay present inside the feedback loop. Due to an inability to move backward in time (i.e., an anti-causality problem), the feedback delay sets a limit to the SNR gain of existing feedback DC restoration schemes. Furthermore, the feedback delay in the feedback loop creates complex loop behavior that can cause loop instability. In addition to the DC-restoration loop mentioned above, typical read channel architectures utilize many loops that can be either feed-forward loops or feedback loops, wherein each of the loops is controlled independently of each other. Some examples of the loops include an equalization adaptation loop, a timing recover loop and a gain control loop. In contrast, the present invention describes an architecture that may include a unified control over all of the feed-forward loops and the feedback loops, including the loops mentioned above.

SUMMARY OF THE INVENTION

The present invention concerns a method of double detection in a perpendicular magnetic read channel. The method generally comprises the steps of (A) generating an intermediate signal by performing a first detection on an input signal of the perpendicular read channel, the first detection having a first error rate, (B) generating a statistics signal based on the intermediate signal, the statistics signal conveying noise statistics that depend on data in the input signal and (C) generating an output signal by performing a second detection on the input signal using the noise statistics to reduce a second error rate of the second detection compared with the first error rate, wherein the first detection is independent of the second detection.

The objects, features and advantages of the present invention include providing a combined DC restoration double detection and loops that may (i) achieve better error-rate performance than the conventional approaches, (ii) reduce stability problems associated with feedback loops, (iii) drive multiple feed-forward loops from a single detection, (iv) drive multiple feedback loops from the single detection, (v) simplify a digital design process of a read channel architecture compared with conventional techniques, (vi) achieve a good error rate and/or (vii) achieve a complexity reduction compared with conventional designs.

BRIEF DESCRIPTION OF THE DRAWINGS

These and other objects, features and advantages of the present invention will be apparent from the following detailed description and the appended claims and drawings in which:

FIG. 1 is a diagram of a front end in a conventional system having a perpendicular magnetic medium system;

DETAILED DESCRIPTION OF THE PREFERRED EMBODIMENTS

An architecture of the present invention may be referred to as a double detection architecture for a perpendicular magnetic read channel performing two independent detections. A preliminary detection generally makes decisions to drive one or more DC restoration loops and a data-dependent noise-predictive (DDNP)-state-estimation loop. An input signal to the preliminary detection may be less than optimal for detection. As such, an error-rate of the preliminary detection is general higher than the error-rate of a subsequent detection. The second detection may be implemented as a DDNP Viterbi detection (DDNP/VD).

With the preliminary detection driving (i) a feed-forward DC restoration loop and (ii) the DDNP state-estimation loop, the same preliminary detection may also drive all other loops. Specifically, the preliminary detection may also drive one or more of (i) an equalization adaptation loop, (ii) a timing recovery loop, (iii) a feedback DC restoration loop and (iv) a gain control loop.

Read channel signals transmitted through a perpendicular magnetic recording channel generally have large signal power around DC. However, a preamplification in a read head module and AC coupling early in the channel generally blocks transmission of the DC components of the read channel signals. The resulting DC-free signals may show a sharp frequency response change around DC that is usually difficult to equalize to a predefined partial response target. To equalize the DC-free signal properly without incurring large signal-to-noise ratio (SNR) loss, a long equalizer target and a long equalizer response may be implemented in the perpendicular magnetic read channel. Furthermore, refilling the lost DC signal (e.g., DC restoration) using hard-decisions from the preliminary detection may achieve a good SNR gain. The feed-forward DC restoration loop and a delay line generally solve an anti-causality problem intrinsic in the existing feedback loop solutions.

Figure 2:
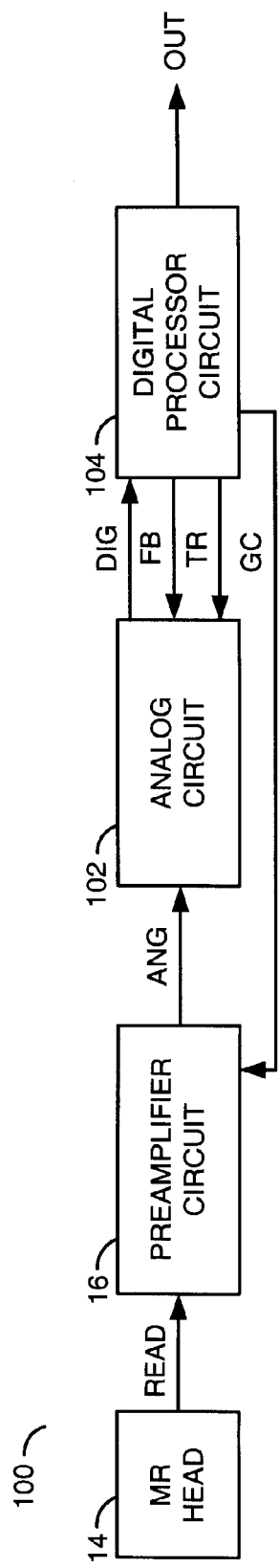
FIG. 2 is a block diagram of a system in accordance with a preferred embodiment of the present invention.

Referring to FIG. 2, a block diagram of a system 100 is shown in accordance with a preferred embodiment of the present invention. The system (or apparatus) 100 generally implements a read channel for a magnetic medium implementing a perpendicular recording scheme (e.g., medium 12). The system 100 generally comprises the read head 14, the preamplifier circuit 16, a circuit (or module) 102 and a circuit (or module) 104. As used below, a read channel signal may generically refer to the read data flowing through the system 100 from the read head 14 to the signal OUT.

Recovering data stored in (on) the perpendicular magnetic media 12 through the system 100 is generally accomplished by using several loops during a signal processing and a data detection process. For example, the timing recovery loop may be implemented because the read channel signal may be a continuous-time signal while in the analog domain and thus generally unsuitable for digital signal processing until converted into the digital domain. In another example, the equalization adaptation loop may be used to adjust the equalization properties in the system 100 over time. The gain control loop may be implemented to adjust an analog gain of the read channel signal early in the system 100. One or two additional loops may be implemented to realize a DC restoration of the read channel signal. A good bit-error-rate may be achieved through both the feed-forward DC restoration loop and the feedback DC restoration loop.

For more advanced data detection, a data-dependent noise-predictive Viterbi detection (DDNP/VD) may be used at the back end of the system 100. Furthermore, a preliminary decision made from the preliminary detection ahead of the DDNP/VD generally reduces the complexity of the DDNP/VD without sacrificing error-rate performance. The independent preliminary detection generally enables the DDNP-state-estimation loop. All of the loops mentioned above may be driven by binary decisions. An error-rate criteria of the binary decisions may be different from one loop to another.

Most of the loops mentioned above, except the feed-forward DC restoration loop and the DDNP state-estimation loop, may be implemented as feedback loops. Each of the loops may rely on a respective independent decision or share the independent detector among some to all of the loops. The DC restoration operations and the DDNP/VD operations may achieve a high performance when implemented through feed-forward loops that eliminate a loop latency and an anti-causality problem.

The read head 14 may generate a signal (e.g., READ) by sensing data read from a perpendicular recorded magnetic medium. An analog signal (e.g., ANG) may be generated by the circuit 16 and presented to the circuit 102. The circuit 102 may generate and present a digital signal (e.g., DIG) to the circuit 104. A feedback signal (e.g., FB) may be presented from the circuit 104 back to the circuit 102. The circuit 104 may also present a timing recovery signal (e.g., TR) to the circuit 102. A gain control signal (e.g., GC) may be presented from the circuit 104 to the circuit 16. The circuit 104 may generate an output signal (e.g., OUT).

The read head 14 may be implemented as a magneto-resistive read head. Other technologies may be used to implement the read head 14 to meet the criteria of a particular application. The signal READ generally includes large low-frequency components due to the perpendicular recording technique. Hereinafter, the low frequency components may be referred to as DC components.

The circuit 16 may be implemented as a preamplifier circuit mounted in (on) the head 14. The circuit 16 may be operational to amplify the signal READ to create the signal ANG. The amplification may have a variable gain controlled by the signal GC. High pass filtering in the circuit 16 may attenuate the DC components in the signal ANG relative to the signal READ.

The circuit 102 generally implements an analog circuit. The circuit 102 may be operational to (i) adjust the signal ANG for asymmetrical characteristics of the head 14, (ii) low pass filter the signal ANG, (iii) digitize the signal ANG to create the signal DIG, (iv) perform a feedback DC restoration to the signal ANG based on the feedback signal FB and (iv) control the digitization based on the signal TR. The signal DIG may convey a sequence of discrete symbols representative of the data sensed by the head 14 to the circuit 104. In some embodiments, the circuit 102 may be fabricated in (on) a chip independent of the head 14/circuit 16 assembly.

The circuit 104 may be implemented as a digital processor circuit. The circuit 104 may be operational to (i) generate and present the signal FB to the circuit 102, (ii) generate and present the signal TR to the circuit 102, (iii) generate and present the signal GC to the circuit 16 and (iv) convert (detect) the sequence of symbols received in the signal DIG to reproduce the data recorded in (on) the medium. The circuit 104 may implement a feed-forward state-estimation loop in support of a data-dependent noise-predictive (DDNP) detection. The circuit 104 may be further operational to perform a feed-forward DC restoration loop to restore the DC components of the signal READ that may have been filtered out by the circuit 16 and/or the circuit 102. In some embodiments, the circuit 104 may be fabricated in (on) another chip independent of the circuit 102 and/or the head 14/circuit 16 assembly.

Figure 3:
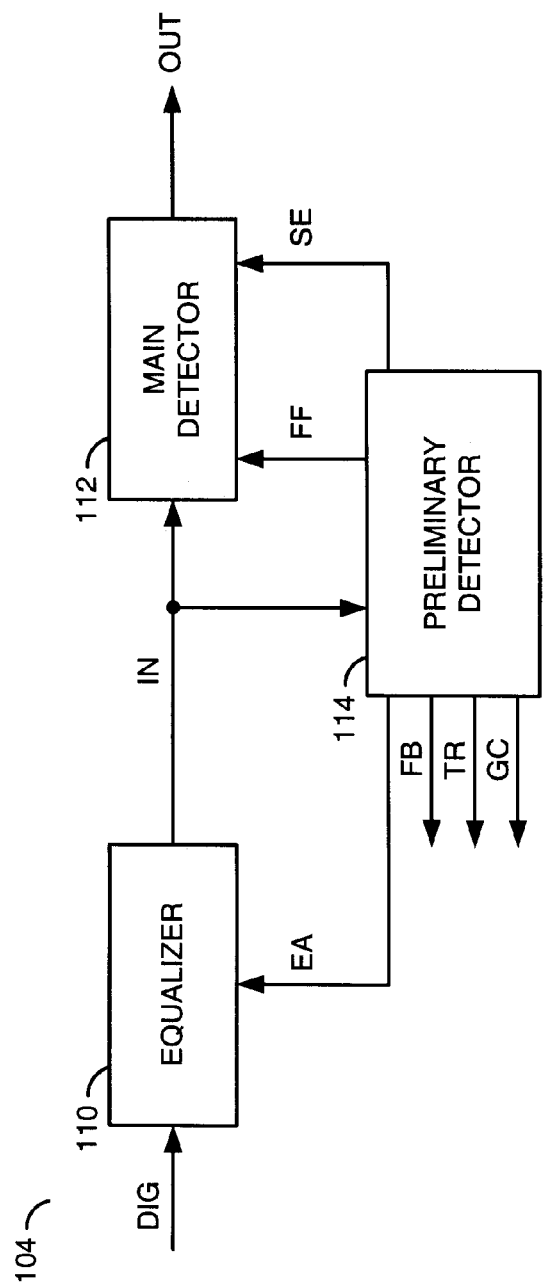
FIG. 3 is a detailed block diagram of an example implementation of a digital processor circuit.

Referring to FIG. 3, a detailed block diagram of an example implementation of the circuit 104 is shown. The circuit 104 generally comprises a circuit (or module) 110, a circuit (or module) 112 and a circuit (or module) 114. The circuit may receive the signal DIG from the circuit 102. A signal (e.g., IN) may be generated by the circuit 110 and presented to both the circuit 112 and the circuit 114. The circuit 112 may generate the signal OUT. The circuit 114 may generate the signal FB, the signal TR and the signal GC. An equalization adaptive signal (e.g., EA) may be generated by the circuit 114 and presented to the circuit 110. A feed-forward signal (e.g., FF) and a state estimation signal (e.g., SE) may also be generated by the circuit 114 and transferred to the circuit 112.

The circuit 110 may be implemented as an equalization circuit. The circuit 110 may be operational to frequency equalize the signal DIG to create the signal IN. In some embodiments, the equalization may be achieved by implementing a finite impulse response (FIR) filter. Other equalization techniques may be implemented to meet the criteria of a particular application.

The circuit 112 may be implemented as a detector circuit. The circuit 112 may be operational to (i) synchronize the data in the signal IN with the data in the signal FF, (ii) restore the previously filtered DC components back into the signal IN and (iii) detect the most likely data sequence based on the DC restored symbols received in the signal IN to generate the signal OUT. As such, the circuit 112 may be referred to as a main detector circuit. In some embodiments, the circuit 112 may perform a DDNP Viterbi detection. Other detection techniques may be implemented to meet the criteria of a particular application.

The circuit 114 generally implements another detector circuit. The circuit 114 may be operational to (i) perform a preliminary detection of the data in the signal IN, (ii) filter a results of the detection to create the signal FF, (iii) filter the results of the detection to create the signal FB, (iv) generate the signal SE based on the results, (v) generate the signal EA based on the results, (vi) generate the signal TR based on the results and (vii) generate the signal GC based on the results. As such, the circuit 114 may be referred to as a preliminary detector circuit.

The role of the circuit 114 generally includes (i) making preliminary decisions on the bits received in the signal IN, (ii) driving an internal DC-restoration feed-forward filter and (iii) driving a DDNP state-estimation operation. The signal FF generated by the DC-restoration filter may convey the missing DC components filtered from the signal READ. The circuit 112 may add the DC components to the signal IN. The combined signal may be processed by a main detector within the circuit 112. Therefore, the target of the main detector is generally a full DC target. A delay line function in the circuit 112 may be situated between the circuit 110 and the main equalizer to synchronize the signal IN with the signal FF. The entire DC-restoration scheme described above effectively adds the missing DC signal to the DC-free pre-equalized signal so that the main detector may ignore the presence of the high pass filters in the front end of the read channel.

The signal SE generally conveys state estimations related to the data detected from the signal IN. The state estimations may be used by the main detection to improve an error rate performance in detecting the data in the DC-restored signal IN. The delay line function in the circuit 112 may synchronize the signal IN with the signal SE.

Figure 4:
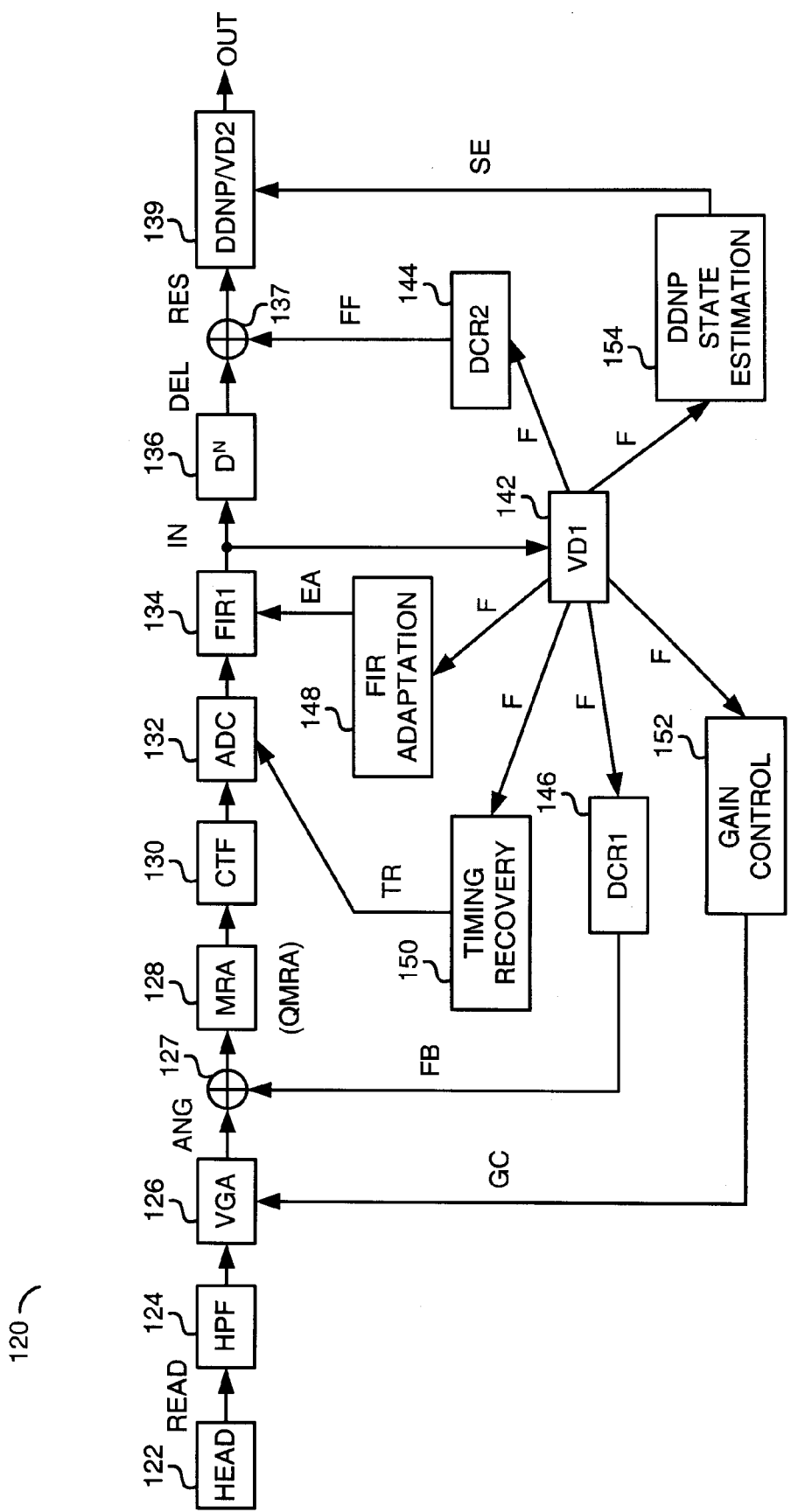
FIG. 4 is a functional block diagram of an example implementation of the system.

Referring to FIG. 4, a functional block diagram 120 of an example implementation of the system 100 is shown. The system 100 generally comprises a block (or module) 122, a block (or module) 124, a block (or module) 126, a block (or module) 127, a block (or module) 128, a block (or module) 130, a block (or module) 132, a block (or module) 134, a block (or module) 136, a block (or module) 137, a block (or module) 139, a block (or module) 142, a block (or module) 144, a block (or module) 146, a block (or module) 148, a block (or module) 150, a block (or module) 152 and a block (or module) 154.

The block 122 may represent operations of the read head 14. The block 122 may create the initial electrical signal READ from the data sense from the perpendicular magnetic medium. The block 124 and the block 126 may represent the operations of the circuit 16. High pass filtering (HPF) may be performed by the block 124. The high pass filtering may provide a high cut off frequency among all previous high pass filters. A variable gain amplification (VGA) may be performed by the block 126. The variable gain may be controlled by the signal GC. The signal ANG may be created by the block 126.

The blocks 127-132 generally represent the operations of the circuit 102. The block 127 may implement a summation module that adds the signal ANG and the signal FB at a start of a DC restoration feedback loop. The block 128 may be operational to provide compensation to a magneto-resistive asymmetry (MRA) characteristic of the head 14. In some embodiments, the block 128 may implement a quadratic MRA (QMRA) compensation. The block 130 is generally operational to implement a continuous time filter (CTF) capability. The CTF may provide waveform smoothing and phase equalization of the read channel signal. An analog-to-digital conversion (ADC) may be performed by the block 132. The block 132 may convert the read channel signal from an analog domain to a digital domain, as conveyed in the signal DIG. Timing for the block 132 may be provided by the signal TR.

The blocks 134-154 generally represent operations of the circuit 104. The block 134 may implement an equalization module that creates the signal IN by equalizing the signal DIG. The equalization parameters of the block 134 may be adjusted (adapted) in real time by the signal EA. The block 134 may be implemented as a finite impulse response (FIR) module. Other equalization techniques may be implemented to meet the criteria of a particular application.

The block 136 generally implements a delay module. The block 136 may be operational to delay the signal IN for a period of time. The period of time may match a (i) delay through the blocks 142 and 144 and (ii) through the blocks 142 and 154. Once delayed, the signal IN may be referred to as a delayed signal (e.g., DEL). The signal DEL may be transferred to the block 139.

The block 137 may implement another summation module. The block 137 may be operational to add the signal DEL to a feed-forward signal (e.g., FF) to create a restored signal (e.g., RES). The addition generally restores the DC components of the read channel signal filtered out by the blocks 124, 128, 130 and/or 134.

The block 139 generally implements a main detection module. The block 139 may be operational to generate the signal OUT by detecting the DC-restored data received from the block 138. In some embodiments, the block 139 may be implemented as a data-dependent noise-predictive Viterbi detector. Other detection designs may be implemented to meet the criteria of a particular application.

The block 142 may implement a preliminary detection module. The block 142 may be operational to generate a detected signal (e.g., F) by performing a preliminary detection of the signal IN. The signal F generally begins a feed-forward loop through the block 144 and the bock 137 that restores the DC aspects of the read channel signal. The signal F may also begin a feed-forward loop through the block 154 to the block 139. One or more feedback loops may be created from the block 142 through one or more of the blocks 146, 148, 150, and/or 152.

The main detection performed by the block 139 may differ from the preliminary detection performed by the block 142. The main detection may have a different target than the preliminary detection since the missing DC component may be restored and a SNR is generally improved for the block 139. Furthermore, the error rates of the main detection may be much lower than the error rates of the preliminary detection due to the restored DC components and the preliminary state estimations.

The block 144 may be implemented as a DC restoration (DCR) filter. The block 144 is generally operational as (i) a low pass filter and (ii) an amplifier to create the feed-forward signal FF from the detected signal F. In some embodiments, the amplification may have a scale factor of approximately 2. Other scale factors may be implemented as appropriate.

The block 144 may have an impulse response described as follows. Let an impulse response of the read channel before a dominant high-pass pole (e.g., usually a high-pass pole in the circuit 102) be $h(z)$. Let the dominant high-pass filter generally be described as $N(z)/D(z)$. Thus, an ideal impulse response of the block 144 may be $h(z)*\{(D(z)-N(z))/D(z)\}*Q(z)$, where * is the polynomial convolution and $Q(z)$ is the equalizer. In some embodiments, the block 144 may be implemented as a simple low pass filter instead of $(D(z)-N(z))/D(z)$ in the above expression with the same cutoff frequency as the dominant high-pass filter.

The block 146 may be implemented as another DC restoration filter. The block 146 is generally operational to generate the feedback signal FB from the detected signal F. The signal F may form a starting point of the DC restoration feedback loop. The block 146 generally restores the missing DC components of the MRA distortion so that the MRA correction performed by the block 128 works correctly.

The block 148 generally implements an equalization (or FIR) adaptation filter. The block 148 may be operational to generate the signal EA from the detected signal F. The block 148 generally employs an adaptation process, such as a least mean square (LMS) process or an recursive least square (RLS) process.

The block 150 may implement a timing recovery operation. The timing information recovered from the signal F may be used to drive the block 132 with the signal TR. The signal TR generally synchronizes the analog-to-digital sampling performed by the block 132 with the data received through the signal READ. In order for the block 150 and the block 132 to work properly, a delay of the timing recovery loop, consisting of the blocks 132, 134, 142 and 150, is generally taken into account. Employing the block 142 may help reduce the timing recovery loop, compared with routing the loop through the block 139

The block 152 may implement a gain control operation. The block 152 is generally operational to create the gain control feedback signal GC based on the signal F. The block 152 generally keeps an amplitude for the signal ANG within a certain range so that the subsequent signal processing blocks may handle the read channel signal without a reduction in the SNR.

The block 154 generally implements a data-dependent noise-predictive state-estimation module. The block 154 may be operational to generate state estimations related to the data detected from the signal IN. The state estimations may be presented to the main detection module 139 via the signal SE. Common implementations of the block 154 typically uses local decision feedback, taking decisions from an internal trellis to reduce complexity. In the present invention, the block 154 may take decisions from the block 142, instead of from the internal trellis. Using the decisions from the block 142 in the block 139 generally results in a lower error rate in the main detection.

The feed-forward loop (e.g., blocks 142 and 144) and the delay block 136 generally solve an anti-causality problem intrinsic in existing solutions. Therefore, the system 100 may achieve an optimal error-rate performance. The optimal error-rate performance is generally defined as the error rate when (i) no high-pass filter is present in the read channel and (ii) the equalizer and the target are jointly optimized. Furthermore, since the DC-restoration is based on the feed-forward loop, the present invention is more robust with the stability problem commonly found in feedback-only techniques.

Depending on channel conditions, such as magneto-resistance asymmetry in the read head, simulation results for the system 100 generally show that the present invention may achieve error rates better than the optimal error-rates defined above. The good error rates are generally due to the DC-restoration scheme behaving as an equalization scheme having infinitely long impulse response.

The present invention may be applied to systems including a post-processor, with or without a parity code. In such cases, the preliminary detector (e.g., block 142) may be eliminated and the main detector (e.g., block 139) may drive the DC-restoration loop through the DC-restoration feed-forward filter and the state-estimation loop through the module 154. The restored DC signal may then be used in the branch metric computation inside the post-processor to improve error-rates.

The functions performed by the diagrams of FIGS. 2-4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of double detection in a perpendicular magnetic read channel, comprising the steps of:
   (A) generating a first sequence of data by performing a first detection on a plurality of symbols in an input signal of said perpendicular magnetic read channel, said first detection having a first error rate associated with said data;
   (B) generating a plurality of estimations based on said first sequence of said data;
   (C) delaying said symbols; and
   (D) generating a second sequence of said data by performing a second detection on said delayed symbols, said second detection using said estimations to reduce a second error rate associated with said data compared with said first error rate, wherein said first detection is independent of said second detection.

2. The method according to claim 1, wherein said second detection comprises a data-dependent noise-predictive Viterbi detection.

3. The method according to claim 2, wherein said first detection comprises a Viterbi detection.

4. The method according to claim 1, further comprising the step of:
   generating a feed-forward signal by filtering said first sequence of said data, wherein a DC component of said input signal was previously filtered out in said perpendicular magnetic read channel.

5. The method according to claim 4, further comprising the step of:
   adding said feed-forward signal to said delayed symbols prior to said second detection, said adding restoring said DC component previously filtered out in said perpendicular magnetic read channel.

6. The method according to claim 1, further comprising the step of:

generating a feedback signal by filtering said first sequence of said data, wherein said feedback signal drives a DC restoration feedback operation in said perpendicular magnetic read channel.

7. The method according to claim 1, further comprising the step of:
generating an adaptation signal based on said first sequence of said data, wherein said adaptation signal adjusts an equalization operation in said perpendicular magnetic read channel.

8. The method according to claim 7, wherein said equalization operation generates said input signal.

9. The method according to claim 1, further comprising the step of:
generating a timing signal based on said first sequence of said data mediate signal, wherein said timing signal synchronizes an analog to digital conversion to in said perpendicular magnetic read channel.

10. The method according to claim 1, further comprising the step of:
generating a gain control signal based on said first sequence of said data, wherein said gain control signal controls a variable gain amplification in said perpendicular magnetic read channel.

11. A circuit comprising:
a preliminary detection module configured to (i) generate a first sequence of data by performing a first detection on a plurality of symbols in an input signal of a perpendicular magnetic read channel, said first detection having a first error rate associated with said data and (ii) generate a plurality of estimations based on said first sequence of said data; and
a main detection module configured to (i) delay said symbols and (ii) generate a second sequence of said data signal by performing a second detection on said delayed symbols, said second detection using said estimations to reduce a second error rate associated with said data compared with said first error rate, wherein said first detection is independent of said second detection.

12. The circuit according to claim 11, wherein said preliminary detection module comprises a Viterbi detector configured to generate said first sequence of said data.

13. The circuit according to claim 11, wherein said main detection module comprises a data-dependent noise-predictive Viterbi detector configured to generate said second sequence of said data.

14. The circuit according to claim 11, wherein said preliminary detection module comprises a state estimation module configured to generate said estimations based on a trellis.

15. The circuit according to claim 11, wherein said preliminary detection module comprises a filter module configured to generate a feed-forward signal by low pass filtering said first sequence of said data.

16. The circuit according to claim 15, wherein said main detection module comprises a summation module configured to generate a restored signal by summing said feed-forward signal to said delayed symbols.

17. The circuit according to claim 11, wherein said preliminary detection module comprises a filter module configured to generate a feedback signal by low pass filtering said first sequence of said data, said feedback signal driving a DC restoration feedback operation in said perpendicular magnetic read channel.

18. The circuit according to claim 11, wherein (i) said preliminary detection module comprises an adapt adaptation module configured to generate an adaptation signal based on said first sequence of said data and (ii) said adaptation signal adjusts an equalization module in said perpendicular magnetic read channel.

19. The circuit according to claim 11, wherein (i) said preliminary detection module comprises a timing module configured to generate a timing signal based on said first sequence of said data and (ii) said timing signal synchronizes an analog to digital converter to said data in said perpendicular magnetic read channel.

20. A circuit comprising:
means for (i) generating a first sequence of data by performing a first detection on a plurality of symbols in an input signal of a perpendicular magnetic read channel, said first detection having a first error rate associated with said data and (ii) generating a plurality of estimations based on said first sequence of said data;
means for delaying said symbols; and
means for generating a second sequence of said data by performing a second detection on said delayed symbols, said second detection using said estimations to reduce a second error rate associated with said data compared with said first error rate, wherein said first detection is independent of said second detection.

* * * * *